July 10, 1923. 1,461,314

E. W. JONES

SEPARATING MECHANISM FOR THRASHERS

Filed June 9, 1919

Inventor:
Emile W. Jones,
By Chas. E. Lord,
Atty.

Patented July 10, 1923.

1,461,314

UNITED STATES PATENT OFFICE.

EMILE W. JONES, OF CHICAGO, ILLINOIS, ASSIGNOR TO INTERNATIONAL HARVESTER COMPANY, A CORPORATION OF NEW JERSEY.

SEPARATING MECHANISM FOR THRASHERS.

Application filed June 9, 1919. Serial No. 302,941.

*To all whom it may concern:*

Be it known that I, EMILE W. JONES, a subject of King of Sweden, residing at Chicago, in the county of Cook and State of Illinois, have invented certain new and useful Improvements in Separating Mechanism for Thrashers, of which the following is a full, clear, and exact specification.

This invention relates to threshing machines and more particularly to screening or separating mechanism for machines of this character.

It is important for the efficient screening and separating of the grain in threshing machines that the material being separated be spread evenly across the screen. When the threshing machine is transported around a field of grain, as is the case with the harvester thrasher, the unevenness of the ground causes the machine to tilt, one side of the mechanism being positioned higher than the other. It will be readily seen that as one side of the machine is tilted upwardly, and the other side downwardly, the grain and chaff which has been deposited upon the screen of the separator will be thrown to one side of the screen, thereby tending to clog the screen and interfere with the efficient separation of the grain from the chaff.

With these difficulties in mind, the object of the present invention is to overcome this condition, and effect an even distribution of the grain and chaff across the screening mechanism of the separator.

In the present instance, this object has been accomplished by the provision of means positioned at the opposite sides of the separator for forcing the material to be separated toward the center of the upper screen, thereby evenly distributing this material.

In the accompanying drawings one embodiment of my invention has been illustrated, and in these drawings—

Figure 2:
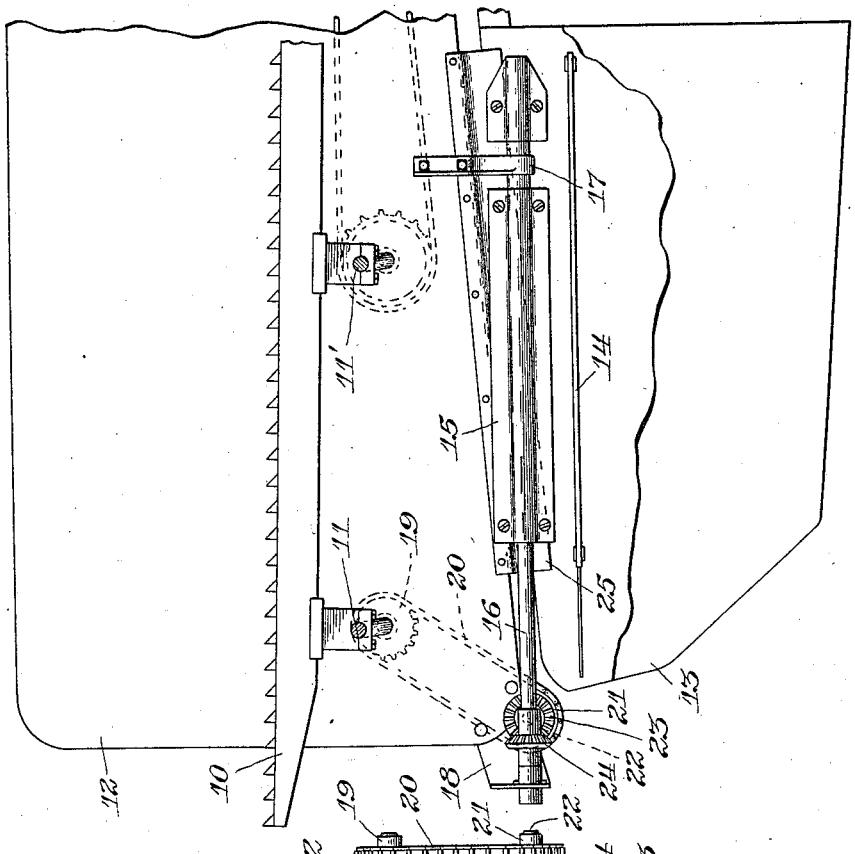
Figure 1:
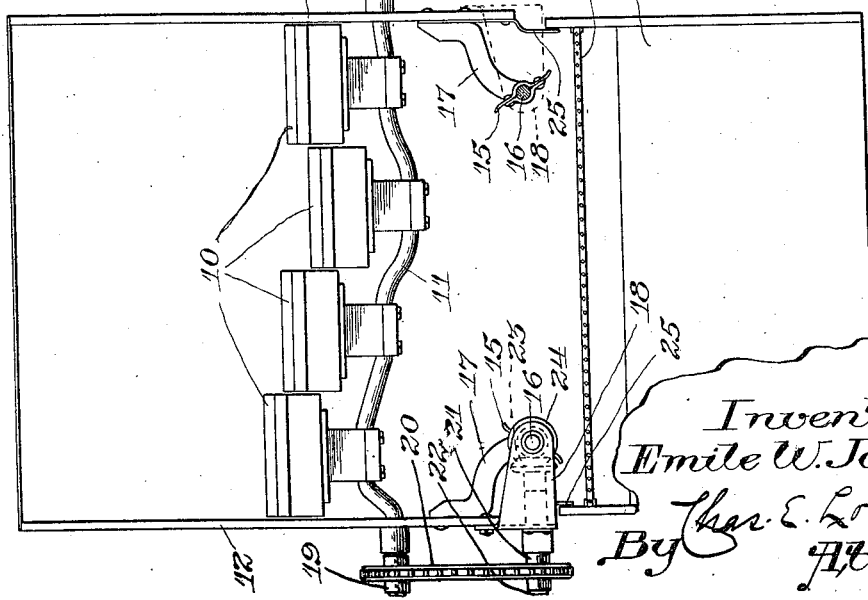

Fig. 1 shows the rear elevation of a portion of a threshing machine, the straw carriers and a portion of the separator being illustrated in connection with my distributing mechanism; and Fig. 2 is a side elevation of the construction shown in Fig. 1.

In the drawings the usual type of straw carriers 10 have been illustrated, these carriers being operated by the crank shafts 11 and 11' suitably journaled in the sides 12 of the machine casing. Disposed below the straw carriers is the usual separator mechanism 13 the upper screen 14 only of the separator mechanism being illustrated in detail, since there is no novelty in the specific construction of the separator, and applicant is not claiming the separator per se.

The improved distributing mechanism comprises beaters 15 carried by beater shafts 16 journaled at their front ends in brackets 17 carried by the side walls 12 of the casing of the threshing machine and journaled at their rear ends in brackets 18 also carried by the side walls 12 of the casing. These beaters are driven from the crank shaft 11 of the straw walkers, sprockets 19 being provided on the outer ends of these shafts and these sprockets being connected by chains 20 with sprockets 21 carried by jack shafts 22 suitably journaled in the walls 12. These jack shafts are provided at their inner ends with beveled gears 23 which mesh with beveled gears 24 carried by the rear ends of the beater shafts 16. As the separator mechanism 13 is oscillated in the usual manner, means is provided to close the opening between the separator and the walls 12 of the threshing machine in order to prevent any grain from being thrown outwardly between these members by the beaters 15. The means provided in the present instance comprises shield members 25 which are secured to the lower edges of the walls 12 and are offset to a position adjacent the inner edges of the side walls of the separator, as clearly illustrated in Fig. 1.

A distinct advantage is obtained in connecting the beater shafts to the crank shafts of the straw carriers in that the speed of the beaters is always maintained in a constant ratio with the speed of the straw carriers, and as the straw walkers are speeded up the beaters will also be speeded up and will therefore be enabled to handle an increased quantity of material.

It is believed that the operation of the device will be clear from the above description of the construction, but a brief statement of the operation is given below.

As is well known, the straw, grain and chaff is deposited on the straw carriers from the threshing cylinder, the straw being gradually moved rearwardly and the chaff and grain passing through the straw carriers being deposited on the separator mechanism. The separator mechanism is oscillated in the usual manner, the chaff being discharged at the rear of the machine and the grain passing through the screening mechanism and finally being delivered to the sacks.

When the machine is used on side hills the tendency of the grain and chaff is to move to one side of the separating mechanism, but the beaters 15 are rotated in the proper direction to force the grain and chaff toward the center of the separator, thereby effecting an even distribution of the material across the width of the separator.

The beater blades illustrated will act upon the grain directly and will also so direct currents of air that the chaff and grain will be blown toward the center as well as being forced toward the center by direct contact of the blades therewith.

While I have in the above specification shown and described but a single embodiment of my invention, it is to be understood that my invention is capable of modification. Changes, therefore, in the construction and arrangement of parts may be made without departing from the spirit and scope of my invention, as expressed in the appended claims.

1. In a threshing machine, a casing, straw carriers carried by said casing, a crank shaft for operating said straw carriers, a separator, located below said carriers and a revolving beater disposed above said separator and operatively connected with said crank shaft for evenly distributing the material to be separated across said separator.

2. In a threshing machine, a casing, straw carriers carried thereby, a crank shaft for operating said straw carriers an oscillatory separator positioned below said straw carriers, and means comprising a rotary shaft having oppositely disposed blades carried by said casing and operatively connected to said crank shaft for evenly distributing the material to be separated across said separator.

3. In a threshing machine, a screen, straw carriers positioned above said screen, a crank shaft for operating said straw carriers, and rotary beaters operatively connected to said crank shaft for evenly distributing the material to be operated upon across said screen.

4. In a threshing machine, a screen, straw carriers positioned above said screen, a crank shaft for operating said straw carriers, and a rotary beater operatively connected to said crank shaft and comprising oppositely disposed blades extending longitudinally with respect to said machine for distributing the material to be operated upon across said screen.

In testimony whereof I affix my signature.

EMILE W. JONES.